United States Patent Office 3,775,396
Patented Nov. 27, 1973

3,775,396
NOVEL GLUCURONIC ACID DERIVATIVES AND PROCESS FOR THE PREPARATION THEREOF
Kiyoshi Okui, Rokuro Kaifu, Renpei Nagashima, and Yoshikazu Hinohara, Takada, Japan, assignors to Chugai Seiyaku Kabushiki Kaisha, Tokyo, Japan
Filed May 12, 1971, Ser. No. 142,671
Claims priority, application Japan, May 14, 1970, 45/40,525
Int. Cl. C07c 47/18
U.S. Cl. 260—210 R
28 Claims

ABSTRACT OF THE DISCLOSURE

Novel glucuronic acid derivatives of the formula

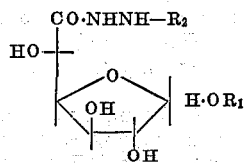

wherein $R_1$ is a lower alkyl group, and $R_2$ is a phenyl group which may contain one or more substituents selected from the group consisting of a lower alkyl group, a lower alkoxy group, a nitro group and a halogen atom, which are useful as a pharmaceutical, in particular, for the prevention and treatment of liver function disorders, are disclosed. The glucuronic acid derivatives can be prepared by reacting an alkyl-D-glucofuranosiduronolactone of the formula

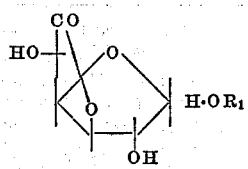

with a phenylhydrazine compound of the formula $$H_2N \cdot NH—R_2$$

wherein $R_1$ and $R_2$ are as defined above.

---

This invention relates to novel glucuronic acid derivatives of the formula

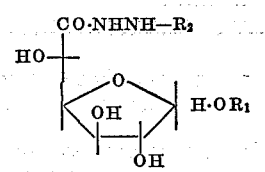

wherein $R_1$ is a lower alkyl group, and $R_2$ is a phenyl group which may contain one or more substituents selected from the group consisting of a lower alkyl group, a lower alkoxy group, a nitro group and a halogen atom, and to a process for the preparation thereof.

In accordance with the present invention, the novel glucuronic acid derivatives represented by the above formula are prepared by reacting an alkyl-D-glucofuranosiduronolactone of the formula

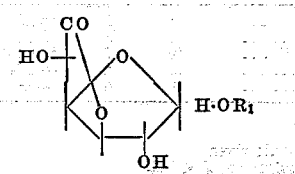

wherein $R_1$ is as defined above, when a phenylhydrazine compound of the formula $$H_2N \cdot NH—R_2$$

wherein $R_2$ is as defined above.

The starting material, alkyl-D-glucofuranosiduronolactone, used in the process of this invention can be prepared by the conventional procedures. For example, it can easily be prepared by reacting D-glucuronolactone with a selected alcohol in the presence of an acidic ion-exchange resin or hydrogen chloride as a catalyst.

The process of this invention can be carried out by heating the reactants alkyl-D-glucofuranosiduronolactone and phenylhydrazine compound. If necessary, the reactants may be dissolved in an appropriate organic solvent such as alcohol, chloroform or the like. The phenylhydrazine compound is preferably used in an equimolar amount or in excess with respect to the alkyl-D-glucofuranosiduronolactone. The temperature and the period required for completing the reaction depend upon the type of the reactants, solvent used, etc., but are usually approximately in the range of from one-half to six hours at or near the refluxing temperature of the reaction mixture.

The starting material, alkyl-D-glucofuranosiduronolactone may be used in an isolated and purified form or, alternatively, may be a reaction mixture of the above-described reaction of D-glucuronolactone and an alcohol, from which the catalyst has been removed. In the latter case, the process of this invention can be carried out by adding a phenylhydrazine compound to the reaction mixture followed by heating.

The thus obtained alkyl-D-glucuronosidephenylhydrazides of this invention, which are noval compounds not previously disclosed in literature, exhibit low toxicity and high stability and are extremely useful as pharmaceuticals, in particular, for the treatment of liver function disorders.

It is to be understood that the product and the starting alkyl-D-glucofuranosiduronolactone of this invention may exist in α- or β-form. The present invention includes within its scope the mixture of such α- and β-forms as well as a separated α- or β-form.

Figure 1:
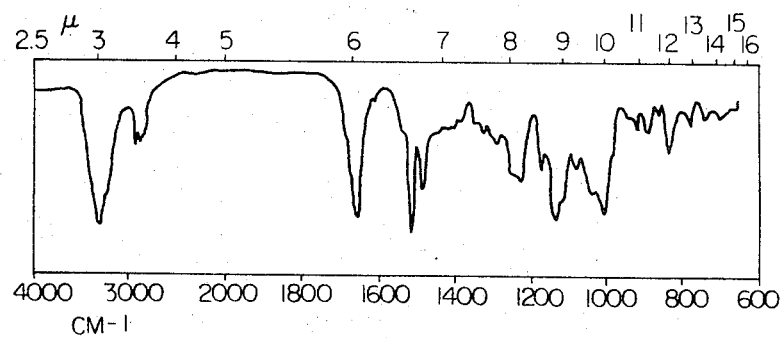
FIG. 1 is an infrared absorption spectrum of ethyl-D-glucuronoside-p-ethoxyphenylhydrazide in α-form.

The present invention is further illustrated by the following experiment and examples but these are given for exemplifying the specific embodiments only and are not to be construed as limiting the scope of the invention.

EXPERIMENT 1

The pharmacological activity of the compounds of this invention are shown in Table 1. The percent prevention of hepato-cellular necrosis was determined as follows: Mice were administered test compounds (per os) together with 0.2 ml./mg. (body weight) of carbon tetrachloride (i.p.) and, after 20 hours of such administrations, Evans Blue dye was administered intravenously. After 30 minutes of the dye administration, liver was excised from the sacrificed mice and the amount of dye which had penetrated into the liver was determined. Two control groups were also used, one receiving only carbon tetrachloride and other receiving neither test compound nor $CCl_4$. The percent prevention of hepato-cellular necrosis (average of five mice in each case) was calculated by the following formula:

Percent prevention hepato-cellular necrosis $$= \frac{1-(A-B)}{C-B} \times 100$$

A = dye amount in the group receiving test compound + $CCl_4$.
B = dye amount in the untreated control group.
C = dye amount in the group receiving only $CCl_4$.

TABLE 1

| Compound | Dose (mmole/kg.) | Prevention of hepatocellular necrosis (percent) |
|---|---|---|
| Methyl-β-D-glucuronoside-p-tolylhydrazide | 0.5 | 100 |
| | 0.25 | 80 |
| | 0.20 | 50 |
| | 0.1 | 0 |
| Ethyl-β-D-glucuronoside-p-chlorophenylhydrazide | 0.5 | 100 |
| | 0.025 | 94 |
| | 0.013 | 50 |
| | 0.01 | 4 |
| Ethyl-D-glucuronoside-p-tolylhydrazide.1/2 dioxane | 0.25 | 100 |
| | 0.15 | 50 |
| | 0.1 | 20 |
| | 0.05 | 0 |
| Ethyl-D-glucuronoside-phenylhydrazide | 0.5 | 100 |
| | 0.25 | 60 |
| | 0.20 | 50 |
| | 0.1 | 0 |
| n-Butyl-D-glucuronoside-phenylhydrazide | 0.1 | 100 |
| | 0.060 | 50 |
| | 0.05 | 30 |
| | 0.025 | 0 |
| n-Butyl-D-glucuronoside-p-tolylhydrazide | 0.1 | 100 |
| | 0.070 | 50 |
| | 0.05 | 0 |
| n-Butyl-D-glucuronoside-p-chlorophenylhydrazide | 0.05 | 100 |
| | 0.030 | 50 |
| | 0.025 | 30 |
| | 0.01 | 0 |
| Ethyl-α-D-glucuronoside-p-ethoxyphenylhydrazide | 0.1 | 100 |
| | 0.05 | 95 |
| | 0.025 | 80 |
| | 0.013 | 50 |
| | 0.01 | 25 |
| Ethyl-β-D-glucuronoside-p-ethoxyphenylhydrazide | 0.25 | 100 |
| | 0.10 | 95 |
| | 0.05 | 95 |
| | 0.03 | 90 |
| | 0.013 | 50 |
| | 0.01 | 10 |

EXPERIMENT 2

The effect of ethyl-D-glucuronoside-p-ethoxyphenylhydrazide (a mixture of α- and β-forms, herein called as GFUA p-EPH) against various experimental liver injuries (1) $CCl_4$-induced acute liver injuries.—(a) Serum transaminase (mouse): Five male mice (ddY-strain, 25–30 g.), having received GFUA p-EPH (35.6 mg./kg.) orally 30 minutes before, were injected with $CCl_4$ (0.2 mg./kg.) intraperitoneally.

After 22 hours, serum transaminase (glutamic-oxalacetic transaminase and glutamic-pyruvic transaminase) activities were determined. The results are shown in the following table.

TABLE 2

| | Number of mice | Mean±S.D. GOT [1] | Mean±S.D. GPT [1] |
|---|---|---|---|
| GFUA p-EPH plus $CCl_4$ | 5 | 0.25±0.06 | 0.07±0.04 |
| $CCl_4$ only | 5 | 4.38±1.35 | 2.65±0.48 |
| Normal control | 5 | 0.11±0.01 | 0.03±0.02 |

[1] Unit in μmole oxalacetate/min./ml. serum.

As is clear from the table, the elevation of serum transaminase activities was reversed to normal by the administration of GFUA p-EPH.

(b) Serum transaminase (rat): Four or six female rats (Wistar-Imamichi strain, 195–295 g.), having received GFUA p-EPH (100 mg./kg.) orally 1 hour before, were injected with $CCl_4$ intraperitoneally.

After 24 hours, serum transaminase (glutamic-oxalacetic transaminase and glutamic-pyruvic transaminase) activities were determined. The results are shown in the following table.

TABLE 3

| | No. of rats | Mean±S.D. GOT [1] | Mean±S.D. GPT [1] |
|---|---|---|---|
| GFUA p-EPH plus $CCl_4$ (0.5 ml./kg.) | 4 | 13±10 } [2] | 15±1 } [2] |
| $CCl_4$, 0.5 ml./kg. only | 4 | 226±83 | 53+12 |
| GFUA p-EPH plus $CCl_4$ (1.5 ml./kg.) | 4 | 55±24 } [2] | 12±3 } [2] |
| $CCl_4$, 1.5 ml./kg. only | 4 | 167±75 | 55±46 |
| Normal control | 6 | 20±6 | 14±4 |

[1] Karmen units in 50 times diluted serum.
[2] P <0.05.

As is clear from the table, the elevation of serum transaminase activities was reversed to normal by the administration of GFUA p-EPH.

(c) Bromosulfophthalein (herein called as BSP) retention (mouse): Five or six male mice (ddY-strain, 25–30 g.), having received GFUA p-EPH (20 mg./kg.) orally 30 minutes before, were injected with $CCl_4$ intraperitoneally.

After 24 hours, BSP (50 mg./kg.) was injected intravenously to the mice and plasma BSP concentration was determined at 10 minutes after BSP injection with optical densities at 570 mμ of the alkalinized plasma. The results are shown in the following table.

TABLE 4

| | Number of mice | BSP, mean O.D.±S.D. |
|---|---|---|
| GFUA p-EPH, 0.2 ml. $CCl_4$/kg. | 6 | 0.027±0.010 |
| 0.2 ml. $CCl_4$/kg. only | 5 | 0.224±0.085 |
| GFUA p-EPH, 0.5 ml. $CCl_4$/kg. | 6 | 0.025±0.010 |
| 0.5 ml. $CCl_4$/kg. only | 5 | 0.293±0.093 |
| Normal control | 5 | 0.020±0.007 |

(d) BSP retention (rat): Three, five or six male rats (Wistar-Imamichi strain, 200–250 g.), having received GFUA p-EPH (100 mg./kg.) orally 1 hour before, were injected with $CCl_4$ (1.0 ml./kg.) intraperitoneally.

After 24 hours, BSP (100 mg./kg.) was injected intraveneously to the mice and plasma BSP concentration was determined at 45 minutes after BSP injection. The results are shown in the following table.

TABLE 5

| | Number of rats | Plasma BSP, mg. percent |
|---|---|---|
| GFUA p-EPH, 40 mg./kg., p.o. | 5 | [1] 8.9±8.8 |
| GFUA p-EPH, 80 mg./kg., p.o. | 6 | 6.0±2.1 |
| GFUA p-EPH, 160 mg./kg., p.o. | 6 | 3.7±2.0 |
| $CCl_4$ only | 6 | 20.6±10.4 |
| Normal control | 3 | 1.2±0.4 |

[1] S.D.

(e) Fatty liver (mouse): Male mice (ddY-strain, 20–26 g.), starved for 17 hours before the experiment, were used.

Four, five or six mice, having received GFUA p-EPH (50 mg./kg.) orally 30 minutes before, were injected with $CCl_4$ intraperitoneally and the amounts of triglycerides and phospholipids in the liver was determined at 6 or 24 hours after $CCl_4$ administration. The results are shown in the following table.

TABLE 6

| | Time after $CCl_4$ admin., hrs. | No. of mice | Triglycerides,[a] mg./g. wet liver | Phospholipids,[b] mg./g. wet liver |
|---|---|---|---|---|
| GFUA p-EPH $CCl_4$ | 6 | 5 | 48±21 | 35.8±2.9 |
| $CCl_4$ only | 6 | 5 | 66±9 | 34.4±1.1 |
| GFUA p-EPH $CCl_4$ | 24 | 6 | 54±20 } [d] | 35.3±2.9 |
| $CCl_4$ only | 24 | 5 | 106±31 | 33.4±1.9 |
| Normal control | [c] | 4 | 30±7 | 32.8±2.9 |

[a] As tripalmitin.
[b] As lecithin.
[c] 24 hrs. after vehicle given.
[d] Difference significant at P <0.01.

(f) Liver protein synthesis (mouse): Four male mice (ddY-strain, about 20 g.), having received GFUA p-EPH orally 30 minutes before, were injected with $CCl_4$ (1.5 ml./kg.) intraperitoneally.

After 1 or 2 hours, phenylalanine-U-$C^{14}$ was injected intraperitoneally to the mice in a dose of $1\mu$ Ci/10 g. and phenylalanine-U-$C^{14}$ incorporated into trichloroacetic acid-insoluble protein of the liver was determined at 30 minutes after the injection of phenylalanine-U-$C^{14}$. The results are shown in the following table.

TABLE 7

| | Cell fraction | | | |
|---|---|---|---|---|
| | Microsome | | Supernatant | |
| | Incorporation per mg. protein | Protein per g. liver | Incorporation per mg. protein | Protein per g. liver |
| 1 hour after $CCl_4$, GFUA p-EPH, 100 mg./kg., p.o.: | | | | |
| Normal control | 100±9 | 21.8±2.4 | 100±6 | 54.7±1.9 |
| $CCl_4$ only | 66.3±5.6 (¹) | 21.7±1.9 | 67.7±15.5 (¹) | 53.9±2.4 |
| GFUA p-EPH plus $CCl_4$ | 125±23 (¹) | 24.4±1.4 | 116±6 (¹) | 52.3±1.0 |
| GFUA p-EPH only | 104±19 | 28.4±2.1 | 117±7 | 60.3±2.7 |
| 2 hours after $CCl_4$, GFUA p-EPH, 50 mg./kg., p.o.: | | | | |
| Normal control | 100±22 | 26.5±3.0 | 100±23 | 75.4±23.1 |
| $CCl_4$ only | 46.0±13.2 (¹) | 21.5±1.9 | 65.5±12.0 (²) | 55.7±4.6 |
| GFUA p-EPH plus $CCl_4$ | 75.0±15.7 (²) | 29.1±2.9 | 97.8±9.4 | 63.8±4.0 |
| GFUA p-EPH only | | | | |

¹ $P < 0.01$.
² $P < 0.05$.

Note.—Incorporation of the radioactivity was expressed relative to the values for respective normal control. Protein, mg./g. wet liver.

As is clear from the table, the decrease of liver protein synthesis, one of the earliest disturbance, was reversed or attenuated by administration of GFUA p-EPH.

(2) Thiacetamide-induced acute liver injuries.—Five male mice (ddY-strain, 20–30 g.), having received GFUA p-EPH (35.6 mg./kg.) orally 30 minutes before, were inpected with thioacetamide (200 ml./kg.) intraperitoneally.

After 24 hours, serum transaminase (glutamic-oxalacetic transaminase and glutamic-pyruvic transaminase) activities were determined. The results are shown in the following table.

TABLE 8

| | $\mu$mole oxalacetate/min./ml. | |
|---|---|---|
| | GOT | GPT |
| Thioacetamide only | 1.16±0.60 | 0.66±0.28 |
| GFUA p-EPH plus thioacetamide | 0.20±0.06 | 0.09±0.01 |
| Normal control | 0.11±0.01 | 0.03±0.02 |

Note.—Mean±S.D. of 5 animals.

As is clear from the table, the elevation of serum transaminase activities was reversed to normal. Histopathological examinations revealed no signs of abnormalities in the liver.

(3) Ethionine-induced acute liver injuries.—Four or six female rats (Wistar-Imamichi strain, 195–295 g.), starved for 16 hours before the experiment, were used.

Four or six rats, having received GFUA p-EPH (100 mg./kg.) orally 1 hour before, were injected with ethionine intraperitoneally.

After 24 hours, serum transaminase (glutamic-oxalacetic transaminase and glutamic-pyruvic transaminase) activities were determined. The results are shown in the following table.

TABLE 9

| | Number of rats | GOT | GPT |
|---|---|---|---|
| GFUA p-EPH plus ethionine, 250 mg./kg. | 4 | 50±8 | 23±7 |
| Ethionine, 250 mg./kg. only | 4 | 47±6 | 20±2 |
| GFUA p-EPH plus ethionine, 750 mg./kg. | 4 | 84±16 (¹) | 26±5 (¹) |
| Ethionine, 750 mg./kg. only | 4 | 122±13 | 42±10 |
| Normal control | 6 | 44±8 | 21±6 |

¹ $P < 0.05$.

Note.—Mean±S.D. Karmen Units in 11 times diluted serum.

(4) Liver injuries due to long-term treatment with $CCl_4$.—The results of an eight-week study, using female rats treated with 1.5 ml./kg. of $CCl_4$ subcutaneously twice a week, show marked reductions of liver fibrosis as well as vacuolization and/or fatty changes of hepatic cells due to daily coadministration of 40 mg./kg. of GFUA p-EPH (Table 10).

TABLE 10
Influence of GFUA p-EPH in $CCl_4$-Intoxicated Rat Liver

| | 3 weeks | | | 6 weeks | | | 8 weeks | | |
|---|---|---|---|---|---|---|---|---|---|
| $CCl_4$, 0.15 ml./100 g. 2×/w.: | | | | | | | | | |
| Fibrosis | + | + | ++ | +++ | +++ | +++ | +++ | +++ | +++ |
| Vacuolization fatty change | ++ | +++ | ++ | ++ | +++ | ++ | + | + | + |
| $CCl_4$, GFUA p-EPH 4 mg./100 g. daily: | | | | | | | | | |
| Fibrosis | − | − | ± | + | + | + | ±−+ | ±−+ | ±−+ |
| Vacuolization fatty change | ± | ± | ± | ++ | + | ± | + | ± | ±−+ |

(5) Liver injuries due to long-term chloride deficiency.—Male and female rats were fed with a choline-deficient diet for 5 months. A group of rats were given additionally GFUA p-EPH in a dose of 8 or 40 mg./kg. for the last 3 months. The histopathological results listed in Table 11 indicate that GFUA p-EPH is also effective in this form of nutrient-deficient liver injuries.

TABLE 11
Influence of GFUA p-EPH on Choline Deficient Rat Liver

| | Portal fibrosis | | | | Vacuolization and/or fatty change of hepatic cells | | | |
|---|---|---|---|---|---|---|---|---|
| | ± | + | ++ | +++ | ± | + | ++ | +++ |
| Choline deficient (5 months) rats (17) | 1 | 2 (9) | 3 | 3 | 0 | 7 (15) | 4 | 4 |
| Rat on choline deficient diet (5 months) and daily oral administration of GFUA p-EPH for last 3 months (7) | 1 | 0 (1) | 0 | 0 | 3 | 1 (5) | 1 | 0 |

Note.—Number of rats in parentheses.

EXPERIMENT 3

Acute toxicity

Acute toxicity was examined by administering ethyl-D-glucuronoside-p-ethoxyphenylhydrazide and ethyl-D-glucuronoside-p-chlorophenylhydrazide orally to male mice (ddY-strain, 25–30 g.). The results are shown in the following.

(a) Mortality after 100 hours

| | Dose, g./kg. | | | | | | |
|---|---|---|---|---|---|---|---|
| | 0.2 | 0.3 | 0.6 | 1.2 | 2.5 | 5 | 10 |
| Ethyl-D-glucuronoside-p-ethoxy-phenylhydrazide | 0/3 | 0/3 | 0/3 | 0/2 | 0/7 | 0/7 | 7/7 |
| Ethyl-D-glucuronoside-p-chloro-phenylhydrazide | 0/3 | 0/3 | 0/3 | 0/2 | 0/1 | 2/4 | 6/6 |

(b) Toxic symptoms

| Ethyl-D-glucuronoside-p-ethoxy-phenylhydrazide: | |
|---|---|
| 10 g./kg | Cyanosis(7/7), convulsion(4/7, tremor 7/7), extension of lower limbs(7/7). |
| 5 g./kg | Cyanosis (7/7). |
| 2.5 g./kg | Do. |

(c) Time to death

| | 2 hrs. | 3 hrs. | 6 hrs. | 24 hrs. | 48 hrs. | 72 hrs. |
|---|---|---|---|---|---|---|
| Ethyl-D-glucuronoside-p-ethoxy-phenylhydrazide (10 g./kg.) | 2 | 2 | 1 | 0 | 1 | 1 |
| Ethyl-D-glucuronoside-p-chloro-phenylhydrazide (10 g./kg.) | 4 | 1 | 0 | 1 | 0 | 0 |

Subacute toxicity

An equal number of male and female rats (2 x 4 x 10) of Wistar-Imamichi strain weighing between 150 and 190 g. received 125, 250 or 500 mg./kg. of GFUA p-EPH or physiologic saline intraperitoneally daily for 30 days. Body weights recorded on the 8, 20 and 30th day indicated no difference between the control and the treated groups. Hematological studies performed on the 15th and 30th day revealed to abnormalities in terms of number of RBC, hemoglobin, number and pictures of WBC. Serum activities of alkaine phosphatase, GOT and GPT, and serum concentrations of BUN and total protein were determined on the 30th day. Approximately two to three-fold increases of GOT activities were noted with the highest dose groups, as listed below in the order of control, 125, 250 and 500 mg./kg. (this pattern will also be followed in the subsequent description): male, 57.4±5.9 (S.D. of 5 animals), 93.7±23.1, 97.3±15.0 and 163±57; female, 60.0±8.0, 71.7±17.3, 65.8±9.8 and 118±23 Karmen units. No abnormalities were found with the other four serum values. The weights of organs (heart, liver, kidneys, testes (or ovaries), adrenals, pituitary, brain) on the 30th day were found in the normal range except for those of the spleen which increased approximately three-fold at the highest dose level in the males: 655±84 (S.D. of 5 animals), 910±102, 1029±50 and 1638±138, while an increase of only 40% was seen in the females: 556±68, 678±87, 879±53 and 783±101 mg. Only minor degrees of histopathological changes were detected at the highest dose level in the liver (vacuolization, 1/10; congestion, 1/10), kidneys (vacuolization or peeling of renal tubule epithelia, 5/10), spleen (congestion, 5/10; increase of reticular cells, 4/10; hemosiderosis, 2/10; follicular cell degeneration, 2/10). No histopathological abnormalities were found in the lungs, heart, digestive tract, brain, pituitary and adrenals.

EXAMPLE 1

3.8 g. of methyl-β-D-glucofuranosiduronolactone was dissolved in 5 ml. of butanol and to the solution was added 4.3 g. of phenylhydrazine followed by heating on a water bath for two hours. The reaction mixture was then concentrated under reduced pressure and ether was added to the residue. The precipitated crystalline methyl-β-D-glucuronoside-phenylhydrazide was recrystallized from ethyl acetate to give 4.2 g. of the product having a melting point of 130–131° C.

Analysis.—Calc'd for $C_{13}H_{18}O_6N_2$ (percent): C, 52.34; H, 6.08; N, 9.39. Found (percent): C, 52.50; H, 6.13; N, 9.27.

EXAMPLE 2

4.2 g. methyl-β-D-glucofuranosiduronolactone was suspended in 10 ml. of butanol and to the suspension was added 4.9 g. of o-tolylhydrazine followed by heating on a boiling water bath for two hours while stirring. The reaction mixture was then concentrated under reduced pressure and dichloromethane was added to the residue to give crystalline methyl-β-D-glucuronoside-o-tolylhydrazide. Recrystallization from isopropyl alcohol yielded 5.1 g. of the product having a melting point of 130–132° C.

Analysis.—Calc'd for $C_{14}H_{20}O_6N_2$ (percent): C, 53.84; H, 6.45; N, 8.97. Found (percent): C, 53.61; H, 6.38; N, 8.92.

EXAMPLE 3

5.4 g. of methyl-β-D-glucofuranosiduronolactone was added to 6.3 g. of m-tolylhydrazine and the mixture was heated on a boiling water bath for one-half hour while stirring to precipitate crystalline methyl-β-D-glucuronoside-m-tolylhydrazide. The resulting product was then washed with chloroform and recrystallized from ethanol-ether to give 6.8 g. of the product having a melting point of 145–147.5° C.

Analysis.—Calc'd for $C_{14}H_{20}O_6N_2$ (percent): C, 53.84; H, 6.45; N, 8.97. Found (percent): C, 53.44; H, 6.42; N, 8.81.

EXAMPLE 4

3.8 g. of p-tolylhydrazine hydrochloride was suspended in 20 ml. of ethanol and to the suspension was added a solution of 0.56 g. of sodium metal in 20 ml. of ethanol. The precipitated sodium chloride was filtered off, and 3 g. of methyl-β-D-glucofuranosiduronolactone was added to the filtrate followed by heat-refluxing for two hours. The reaction mixture was then concentrated under reduced pressure, and the residue was dissolved in hot chloroform. After allowing to cool, the precipitated crystalline methyl-β-D-glucuronoside-p-tolylhydrazide was recrystallized from butanol-isopropyl ether to give 3.2 g. of the product having a melting point of 140–142° C.

Analysis.—Calc'd for $C_{14}H_{20}O_6N_2$ (percent): C, 53.84; H, 6.45; N, 8.97. Found (percent): C, 54.00; H, 6.43; N, 9.11.

EXAMPLE 5

5 g. of 3,4-dimethylphenylhydrazine was dissolved in 10 ml. of butanol and to the solution was added 4 g. of methyl-β-D-glucofuranosiduronolactone followed by stirring on a boiling water bath for two hours. The precipitated crystalline methyl-β-D-glucuronoside-3,4-dimethylphenylhydrazide was recrystallized from isopropyl alcohol to give 4.7 g. of the product having a melting point of 163–165° C.

Analysis.—Calc'd for $C_{15}H_{22}O_6N_2$ (percent): C, 55.20; H, 6.80; N, 8.58. Found (percent): C, 55.20; H, 6.74; N, 8.66.

EXAMPLE 6

4 g. of p-ethylphenylhydrazine was dissolved in 10 ml. of butanol and to the solution was added 3.8 g. of methyl-β-D-glucofranosiduronolactone followed by stirring on a boiling water bath for two hours. Dichloromethane was then added to the reaction mixture to give crystalline methyl-β-D-glucuronoside-p-ethyl-phenylhydrazide. Recrystallization from butanol yielded 5.1 g. of the product having a melting point of 147–150° C.

Analysis.—Calc'd for $C_{15}H_{22}O_6N_2$ (percent): C, 55.20; H, 6.80; N, 8.58. Found (percent): C, 55.60; H, 6.94; N, 8.71.

EXAMPLE 7

450 mg. of o-methoxyphenylhydrazine was dissolved in 1.5 ml. of butanol and to the solution was added 400 mg. of methyl-α-D-glucofuranosiduronolactone followed by stirring on a boiling water bath for 1.5 hours. The reaction mixture was concentrated under reduced pressure and ether was added to the residue to give crystalline methyl-α-D-glucuronoside - o - methoxyphenylhydrazide. Recrystallization from ethanol-ether yielded 470 mg. of the product having melting point 143–144.5° C. and $[α]_D^{20}$ +98° (c., 0.5 in $H_2O$).

*Analysis.*—Calc'd for $C_{14}H_{20}O_7N_2$ (percent): C, 51.21; H, 6.14; N, 8.53. Found (percent): C, 51.10; H, 5.95; N, 8.54.

EXAMPLE 8

5 g. of o-methoxyphenylhydrazine was dissolved in 7 ml. of butanol and to the solution was added 5 g. of methyl-β-D-glucofuranosiduronolactone followed by stirring on a boiling water bath for 1.5 hours. The reaction mixture was then concentrated under reduced pressure, and ether was added to the residue to give crystalline methyl-β-D-glucuronoside - o - methoxyphenylhydrazide. Recrystallization from ethanol yielded 6.7 g. of the product having melting point 148–150° C. and $[α]_D^{20}$ −16° (c., 0.5 in $H_2O$).

*Analysis.*—Calc'd for $C_{14}H_{20}O_7N_2$ (percent): C, 51.21; H, 6.14; N, 8.53. Found (percent): C, 51.54; H, 6.16; N, 8.55.

EXAMPLE 9

8 g. of p-bromophenylhydrazine was dissolved in 15 ml. of ethanol and to the solution was added 6 g. of methyl-β-D-glucofuranosiduronolactone followed by heat-refluxing on a water bath for four hours. The reaction mixture was concentrated under reduced pressure, and chloroform was added to the residue to give crystalline methyl-β-D-glucuronoside-p-bromophenylhydrazide. Recrystallization from ethanol-chloroform yielded 7.2 g. of the product having a melting point of 169–171° C.

*Analysis.*—Calc'd for $C_{13}O_6H_{17}N_2Br$ (percent): C, 41.40; H, 4.54; N, 7.43. Found (percent): C, 41.17; H, 4.44; N, 7.13.

EXAMPLE 10

5.3 g. of 3,4-dichlorophenylhydrazine was dissolved in 10 ml. of butanol and to the solution was added 3.8 g. of methyl-β-D-glucofuranosiduronolactone followed by stirring on a boiling water bath for two hours. The reaction mixture was concentrated under reduced pressure, and chloroform was added to the residue. The precipitated crystals were recrystallized from ethyl acetate to give 5.5 g. of crystalline methyl-β-D-glucuronoside-3,4-dichlorophenylhydrazide containing ½ molecule of crystal water: melting point, 164–167° C.

*Analysis.*—Calc'd for $C_{13}H_{16}O_6N_2Cl_2\cdot½H_2O$ (percent): C, 41.51; H, 4.55; N, 7.45; Cl, 18.85. Found (percent): C, 41.49; H, 4.45; N, 7.44; Cl, 18.78.

EXAMPLE 11

20 g. of D-glucuronolactone was suspended in 400 ml. of ethanol and to the solution was added 10 g. of an ion-exchange resin (Amberlite IR–120 B, H-type, available from Rohm & Haas Company) followed by heat-refluxing for six hours while stirring. The mixture was then filtered and, after addition of 22 g. of phenylhydrazine to the filtrate, the mixture was refluxed for two hours. The reaction mixture was concentrated under reduced pressure, and the residue was recrystallized from chloroform to give ethyl-D-glucuro glucuronoside-phenylhydrazine (a mixture of α- and β-forms). Recrystallization from ethanol yielded 27.2 g. of the product having a melting point of 137–139° C.

*Analysis.*—Calc'd for $C_{14}H_{20}O_6N_2$ (percent): C, 53.84; H, 6.45; N, 8.97. Found (percent): C, 54.01; H, 6.68; N, 9.17.

EXAMPLE 12

10 g. of ethyl-D-glucofuranosiduronolactone (a mixture of α- and β-forms) was dissolved in 40 ml. of butanol and to the resulting solution was added 9 g. of p-tolylhydrazine followed by heat-refluxing for two hours. The reaction mixture was then concentrated under reduced pressure, and the residue was washed with ether-petroleum ether and dissolved in hot dioxane. The solution was then allowed to cool to give 5.7 g. of crystalline ethyl-D-glucuronoside-p-tolylhydrazide containing ½ mole of dioxane (a mixture of α- and β-forms), melting point 135–137° C.

*Analysis.*—Calc'd for $C_{15}H_{22}O_6N_2\cdot½C_4H_8O_2$ (percent): C, 55.12; H, 7.08; N, 7.56. Found (percent): C, 55.17; H, 7.37; N, 7.56.

EXAMPLE 13

Figure 2:
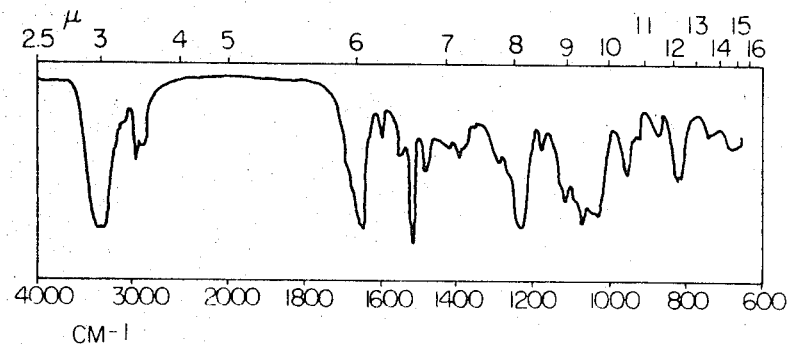
FIG. 2 is an infrared absorption spectrum of ethyl-D-glucuronoside-p-ethoxyphenylhydrazide in β-form.

9.5 g. of ethyl-D-glucofuranosiduronolactone was dissolved in 20 ml. of butanol and to the solution was added 9.5 g. of p-ethoxyphenylhydrazine followed by heating on a water bath for two hours. The reaction mixture was concentrated under reduced pressure, and ether was added to the residue to give crude crystalline ethyl-D-glucuronoside-p-ethoxy-phenylhydrazide. Recrystallization from butanol yielded 1.6 g. of crystals having melting point 173–174° C. and $[α]_D^{20}$ +90° (c., 0.5 in $H_2O$). The mother liquor from the recrystallization was concentrated under reduced pressure and the crystals which were obtained by adding ether-petroleum ether to the residue were recrystallized from ethyl acetate and then from butanol-isopropyl ether to give a second crop of 9.5 g. crystals having melting point 131–132° C. and $[α]_D^{20}$ −16° (c., 0.5 in $H_2O$). The thus obtained first and second crops were considered to be α-form and β-form, respectively, and the infrared absorption spectra (KBr) of the products are shown in FIG. 1 and FIG. 2, respectively.

*Analysis.*—Calc'd for $C_{16}H_{24}O_7N_2$ (percent): C, 53.92; H, 6.79; N, 7.86. Found (percent): C, 54.21; H, 6.71; N, 8.04 (for α-form). Found (percent): C, 54.16; H, 6.93; N, 7.98 (for β-form).

EXAMPLE 14

12 g. of ethyl-D-glucofuranosiduronolactone was dissolved in 20 ml. of butanol, and to the solution was added 12.5 g. of p-chlorophenylhydrazine followed by heat-refluxing for two hours. The reaction mixture was concentrated under reduced pressure, and the residue was washed with ether-petroleum ether and then crystallized from chloroform to give 16 g. of crude crystals of ethyl-D-glucuronoside-p-chlorophenylhydrazide. The thus obtained product was recrystallized first from ethyl acetate and then from ethanol yielded crystals having a melting point of 182–183° C. and $[α]_D^{20}$ +102° (c., 0.5 in methanol) which is considered to be α-form. Also, the mother liquor from the ethyl acetate recrystallization was cooled to give crystals having a melting point of 135.5–137° C. and $[α]_D^{20}$ −25° (c., 0.5 in methanol) which is considered to be β-form.

*Analysis.*—Calc'd for $C_{14}H_{19}O_6N_2Cl$ (percent): C, 48.50; H, 5.52; N, 8.05. Found (percent): C, 48.68; H, 5.56; N, 8.02 (for α-form). Found (percent): C, 48.67; H, 5.57; N, 8.02 (for β-form).

EXAMPLE 15

10 g. of ethyl-D-glucofuranosiduronolactone (a mixture of α- and β-forms) was dissolved in 20 ml. of chloroform and to the solution was added 12 g. of p-bromophenylhydrazine followed by heat-refluxing on a water bath for six hours. Chloroform was then added to the reaction mixture to give crystalline ethyl-D-glucuronoside-p-bromophenylhydrazide (a mixture of α- and β-forms). Recrystallization from ethyl acetate-n-hexane yielded 11.6 g. of the product having a melting point of 134–137° C.

*Analysis.*—Calc'd for $C_{14}H_{19}O_6N_2Br$ (percent): C, 42.98; H, 4.90; N, 7.16. Found (percent): C, 42.81; H, 4.81; N, 6.89.

EXAMPLE 16

3.1 g. of D-glucuronolactone was suspended in 40 ml. of n-butanol and to the suspension was added 1.5 g. of an ion-exchange resin (Amberlite IR–120 B, H-type, available from Rohm & Haas Company) followed by refluxing for six hours while stirring. The resin was filtered off from the reaction mixture and, after concentrating the filtrate to about 10 ml., 4.5 g. of phenylhydrazine was added to the filtrate followed by heating on a boiling water bath for two hours. The reaction mixture was then concentrated under reduced pressure, and the residue was crystallized from ether-petroluem ether. Recrystallization of the thus obtained crystalline product from butanol-isopropyl ether yielded 4.2 g. of butyl-D-glucuronoside-phenylhydrazide, melting point 137–138° C.

Analysis.—Calc'd for $C_{15}H_{24}O_6N_2$ (percent): C, 56.46; H, 7.11; N, 8.23. Found (percent): C, 56.78; H, 7.32; N, 8.25.

EXAMPLE 17

To a solution of 4 g. of butyl-D-glucofuranosiduronolactone in 10 ml. of butanol was added 5 g. of p-tolylhydrazine followed by heating on a water bath for two hours. The reaction mixture was then concentrated under reduced pressure, and the residue was crystallized from ether-petroleum ether. Recrystallization from butanol-isopropyl ether yielded 4.7 g. of butyl-D-glucuronoside-p-tolylhydrazide having a melting point of 136–138° C.

Analysis.—Calc'd for $C_{17}H_{26}O_6N_2$ (percent): C, 57.61; H, 7.40; N, 7.91. Found (percent): C, 57.39; H, 7.38; N, 7.91.

EXAMPLE 18

To a solution of 4 g. of butyl-D-glucofuranosiduronolactone in 10 ml. of butanol was added 6 g. of p-chlorophenylhydrazine followed by heating on a water bath for two hours. The reaction mixture was then concentrated under reduced pressure, and a mixture of ether-petroleum ether was added to the residue to give butyl-D-glucuronoside-p-chlorophenylhydrazide. Recrystallization from butanol-isopropyl ether yielded 5.2 g. of the product having a melting point of 164–165° C.

Analysis.—Cal'd for $C_{16}H_{23}O_6N_2Cl$ (percent): C, 51.27; H, 6.18; N, 7.48. Found (percent): C, 51.49; H, 6.28; N, 7.66.

EXAMPLE 19

5 g. of m-nitrophenylhydrazine was dissolved to 10 ml. of butanol and to the solution was added 3.5 g. of methyl-β-D-glucofuranosiduronolactone followed by heating on a boiling water bath for four hours while stirring. The reaction mixture was cooled to give crystalline methyl-β-D-glucuronoside-m-nitrophenylhydrazide. Recrystallization from isopropyl alcohol yielded 3.7 g. of the product having a melting point of 153–155° C.

Analysis.—Calc'd for $C_{13}H_{17}O_8N_3$ (percent): C, 45.48; H, 4.99; N, 12.24. Found (percent): C, 45.22; H, 4.88; N, 12.04.

What is claimed is:

1. A glucuronic acid derivative of the formula

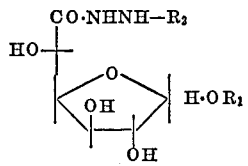

wherein $R_1$ is a lower alkyl group, and $R_2$ is a phenyl group which may contain one or more substituents selected from the group consisting of a lower alkyl group, a lower alkoxy group, a nitro group, a chlorine atom and a bromine atom.

2. A glucuronic acid derivative according to claim 1 wherein the phenyl group of $R_2$ contains one or two of said substituents.

3. A glucuronic acid derivative according to claim 1 wherein the phenyl group of $R_2$ contains one of said substituents at one or two positions thereon.

4. Methyl-D-glucuronoside phenylhydrazide in accordance with claim 1.

5. Methyl-D-glucuronoside-o-tolylhydrazide in accordance with claim 1.

6. Methyl-D-glucuronoside-m-tolylhydrazide in accordance with claim 1.

7. Methyl-D-glucuronoside-p-tolylhydrazide in accordance with claim 1.

8. Methyl - D-glucuronoside-3,4-dimethylphenylhydrazide in accordance with claim 1.

9. Methyl - D-glucuronoside-p-ethylphenylhydrazide in accordance with claim 1.

10. Methyl-D-glucuronoside - o - methoxyphenylhydrazide in accordance with claim 1.

11. Methyl - D-glucuronoside-p-bromophenylhydrazide in accordance with claim 1.

12. Methyl - D-glucuronoside-3,4-dichlorophenylhydrazide in accordance with claim 1.

13. Ethyl-D-glucuronoside-phenylhydrazide in accordance with claim 1.

14. Ethyl-D-glucuronoside-p-tolylhydrazide in accordance with claim 1.

15. Ethyl-D-glucuronoside-p-ethoxyphenylhydrazide in accordance with claim 1.

16. Ethyl-D-glucuronoside-p-chlorophenylhydrazide in accordance with claim 1.

17. Ethyl - D - glucuronoside-p-bromophenylhydrazide in accordance with claim 1.

18. Butyl-D-glucuronoside-phenylhydrazide in accordance with claim 1.

19. Butyl-D-glucuronoside-p-tolylhydrazide in accordance with claim 1.

20. Butyl-D-glucuronoside-p-chlorophenylhydrazide in accordance with claim 1.

21. Methyl-D-glucuronoside-m-nitrophenylhydrazide in accordance with claim 1.

22. A process for preparing a glucuronic acid derivative according to claim 1 consisting of reacting an alkyl-D-glucofuranosiduronolactone of the formula

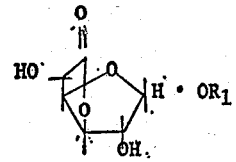

wherein $R_1$ is as defined in claim 1, with a phenylhydrazine compound of the formula

wherein $R_2$ is as defined in claim 1.

23. A process for preparing a glucuronic acid derivative according to claim 2 consisting of reacting an alkyl-D-glucofuranosiduronolactone of the formula

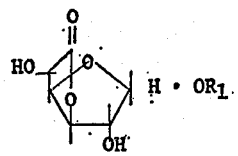

wherein $R_1$ is as defined in claim 2, with a phenylhydrazine compound of the formula

wherein $R_2$ is as defined in claim 2.

24. A process for preparing a glucuronic acid derivative according to claim 3 consisting of reacting an alkyl-D-glucofuranosiduronolactone of the formula

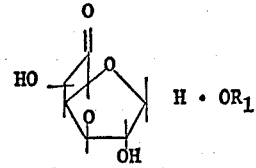

wherein $R_1$ is as defined in claim 3, with a phenylhydrazine compound of the formula

wherein $R_2$ is as defined in claim 3.

25. A process according to claim 22, wherein the reaction is carried out in the presence of an organic solvent.

26. A process according to claim 25, wherein said organic solvent is selected from the group consisting of alcohol and chloroform.

27. A process according to claim 22, wherein said phenylhydrazine is used in an equimolar amount or in excess with respect to the alkyl-D-glucofuranosiduronolactone reactant.

28. A process according to claim 22, wherein said reaction is carried out at or near refluxing temperature of the reaction mixture for a period of from one-half to six hours.

References Cited
UNITED STATES PATENTS
3,284,439   11/1966   Argoudelis _____ 260—210 R OTHER REFERENCES
Noller: "Chemistry of Organic Compounds," 3rd ed., 1965, W. B. Saunders Co., Philadelphia, Pa.

JOHNNIE R. BROWN, Primary Examiner

U.S. Cl. X.R.
424—180